US010143136B2

(12) United States Patent
Sudhues et al.

(10) Patent No.: US 10,143,136 B2
(45) Date of Patent: Dec. 4, 2018

(54) MULTI-SECTION HEADER WITH ADJUSTABLE LATERAL FRAME RELIEF

(71) Applicant: Carl Geringhoff GmbH & Co. KG, Ahlen (DE)

(72) Inventors: Steffen Sudhues, Ahlen (DE); Jan Bernd Schulze Rückamp, Enniger (DE); Jens Amelingmeyer, Osnabrück (DE); Stephan Schulze Selting, Enniger (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 71 days.

(21) Appl. No.: 15/285,501

(22) Filed: Oct. 5, 2016

(65) Prior Publication Data
US 2017/0094904 A1 Apr. 6, 2017

(30) Foreign Application Priority Data
Oct. 5, 2015 (DE) .................. 10 2015 116 892

(51) Int. Cl.
*A01D 41/14* (2006.01)
*A01D 57/20* (2006.01)

(52) U.S. Cl.
CPC .......... *A01D 41/144* (2013.01); *A01D 57/20* (2013.01)

(58) Field of Classification Search
CPC ....... A01B 73/044; A01B 73/04; A01B 73/02; A01B 73/046; A01D 41/144; A01D 41/14; A01D 41/145
See application file for complete search history.

(56) References Cited

U.S. PATENT DOCUMENTS

| | | | | | |
|---|---|---|---|---|---|
| 3,345,808 | A | * | 10/1967 | Van Der Lely | A01D 34/246 56/10.2 R |
| 3,650,333 | A | * | 3/1972 | Fueslein | A01B 73/044 16/231 |
| 3,683,601 | A | * | 8/1972 | Van der Lely | A01D 41/144 56/6 |
| 4,023,623 | A | * | 5/1977 | Anderson | A01B 73/044 172/311 |
| 4,030,551 | A | * | 6/1977 | Boetto | A01B 73/044 172/126 |

(Continued)

FOREIGN PATENT DOCUMENTS

| | | |
|---|---|---|
| DE | 195 25 495 | 1/1997 |
| DE | 10 2007 035 796 | 2/2009 |

*Primary Examiner* — Arpad Fabian-Kovacs
(74) *Attorney, Agent, or Firm* — Gudrun E. Huckett

(57) ABSTRACT

A header has frame sections that are joined for articulation with each other. The frame sections each form a partial working width of the header. The frame sections include outer lateral frame sections and a central frame section. A relief element is connected to the central frame section and an outer lateral frame section adjacent to the central frame section. The relief element is adjustable between a springy setting and a locked setting. The relief element has a spring movable in a loading direction and also a spatial body rigid in the loading direction. The spring is connected to the first outer lateral frame section by a bolt guided in a slotted hole of the rigid spatial body. A pivotable stop element with stops is pivotable into a plurality of pivot positions. A spring travel of the spring is adjustable by the stops of the stop element.

9 Claims, 3 Drawing Sheets

(56) References Cited

U.S. PATENT DOCUMENTS

| | | | | |
|---|---|---|---|---|
| 4,074,766 A * | 2/1978 | Orthman | A01B 73/04 | 172/311 |
| 4,324,296 A * | 4/1982 | Schenk | A01B 73/044 | 172/311 |
| 4,328,869 A * | 5/1982 | Perelli | A01B 73/044 | 172/311 |
| RE31,209 E * | 4/1983 | Anderson | A01B 73/044 | 172/311 |
| 4,878,545 A * | 11/1989 | Dyken | A01B 73/04 | 172/311 |
| 5,724,798 A * | 3/1998 | Stefl | A01D 41/144 | 172/311 |
| 6,223,831 B1 * | 5/2001 | Friggstad | A01B 59/042 | 172/311 |
| 6,675,568 B2 | 1/2004 | Patterson et al. | | |
| 7,073,604 B1 * | 7/2006 | Dobson | A01B 63/32 | 111/57 |
| 7,197,865 B1 * | 4/2007 | Enns | A01B 73/005 | 56/228 |
| 9,198,357 B2 * | 12/2015 | Gantzer | A01D 84/00 | |
| 9,801,343 B2 * | 10/2017 | Markt | A01D 45/00 | |
| 2002/0035826 A1 * | 3/2002 | Albinger | A01D 41/144 | 56/109 |
| 2003/0074876 A1 * | 4/2003 | Patterson | A01D 41/14 | 56/257 |
| 2003/0182912 A1 * | 10/2003 | Boll | A01D 34/661 | 56/14.7 |
| 2004/0123575 A1 * | 7/2004 | Rickert | A01D 41/144 | 56/14.7 |
| 2005/0211144 A1 * | 9/2005 | Gust | A01B 73/044 | 111/54 |
| 2007/0204583 A1 * | 9/2007 | Coers | A01D 57/02 | 56/14.4 |
| 2008/0072560 A1 * | 3/2008 | Talbot | A01D 41/14 | 56/208 |
| 2008/0295473 A1 * | 12/2008 | Tippery | A01D 41/144 | 56/14.5 |
| 2011/0030326 A1 * | 2/2011 | Markt | A01D 41/14 | 56/14.5 |
| 2014/0075906 A1 * | 3/2014 | Heim | A01D 61/004 | 56/105 |
| 2014/0075907 A1 * | 3/2014 | Ritter | A01D 45/021 | 56/105 |
| 2016/0183461 A1 * | 6/2016 | Neudorf | A01D 41/14 | 56/158 |
| 2018/0054967 A1 * | 3/2018 | Markt | A01D 45/021 | |

\* cited by examiner

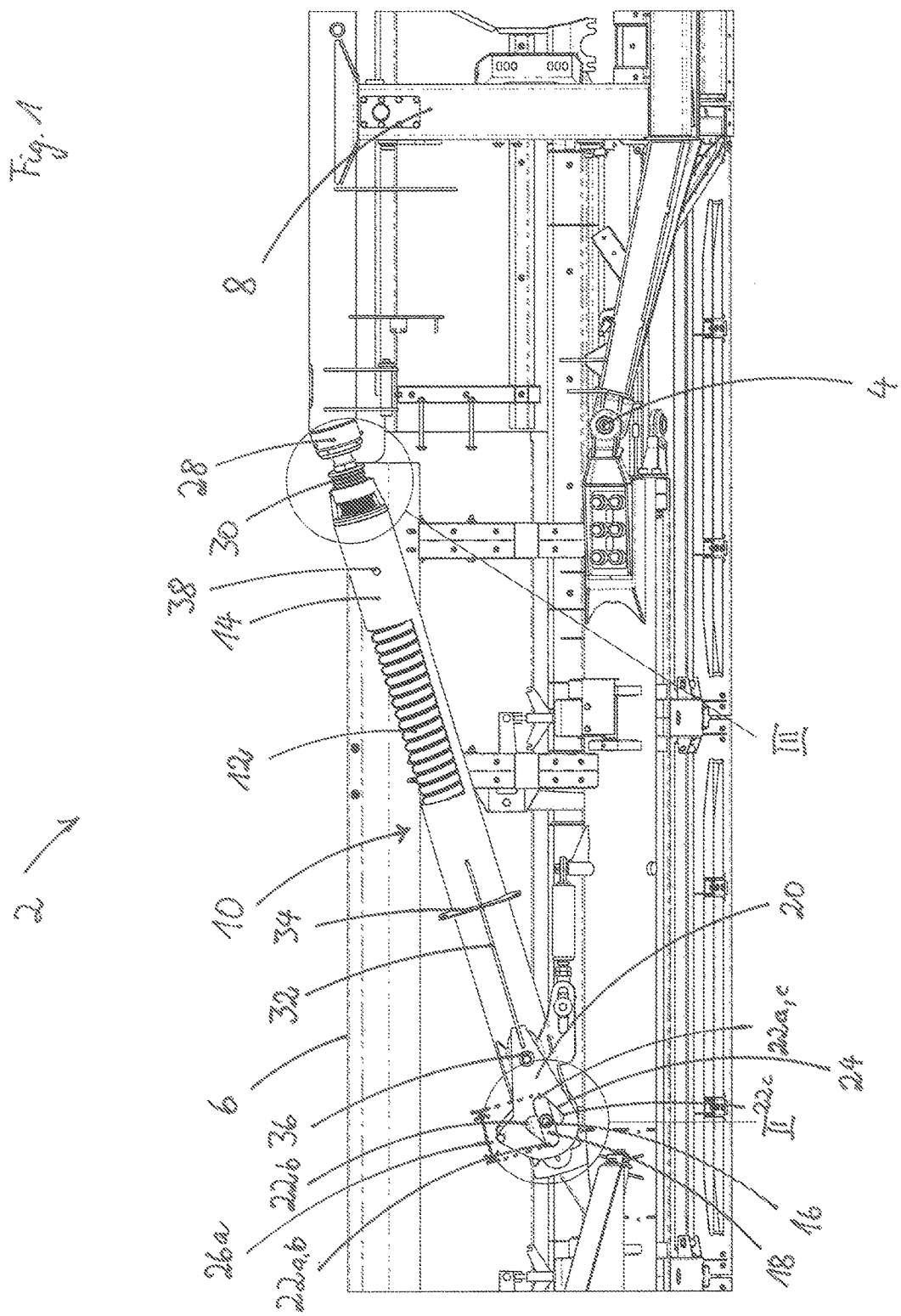

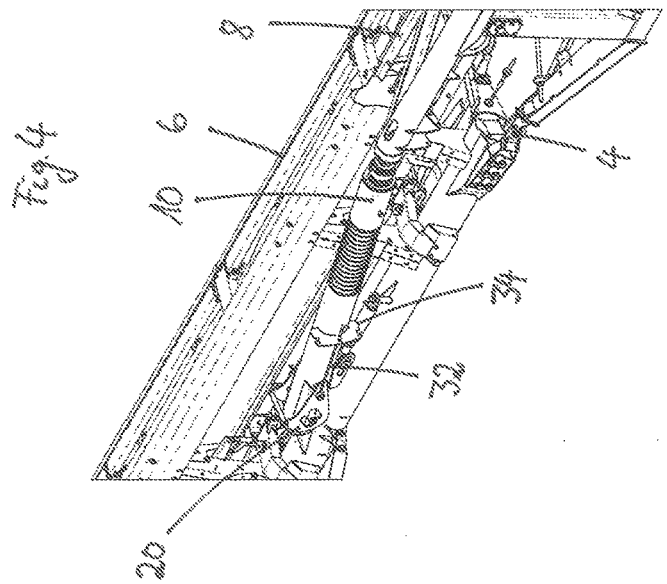
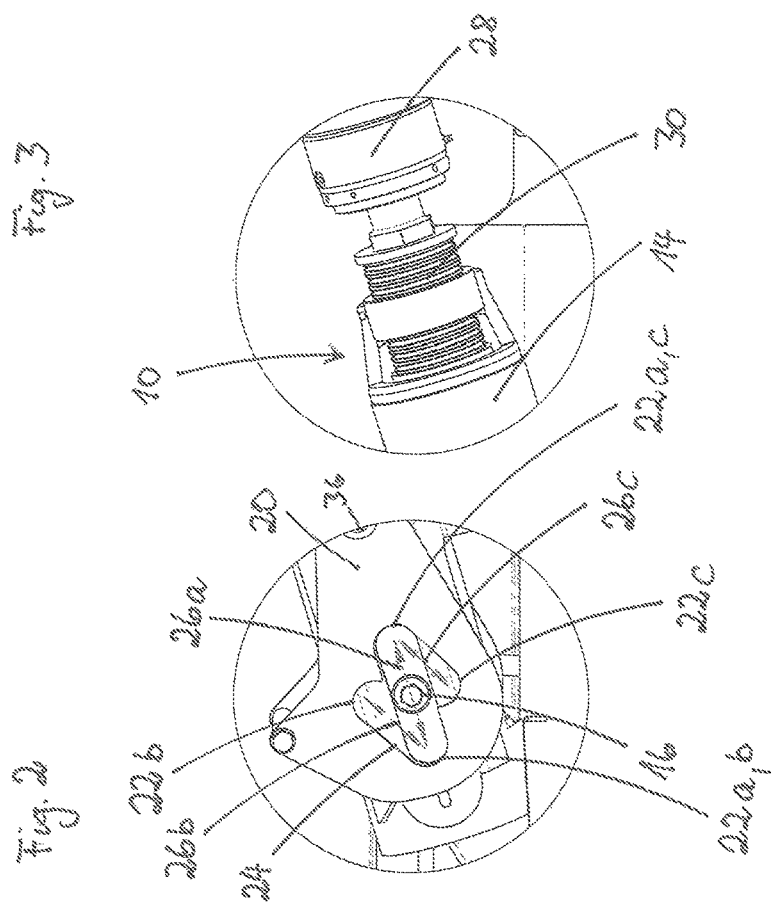

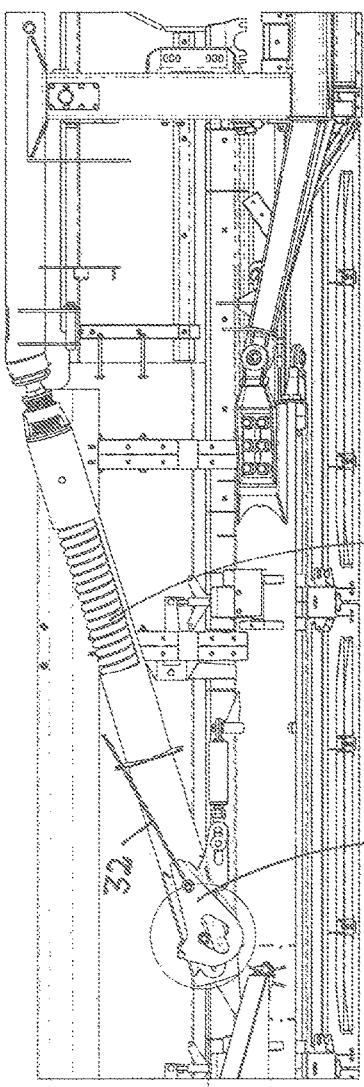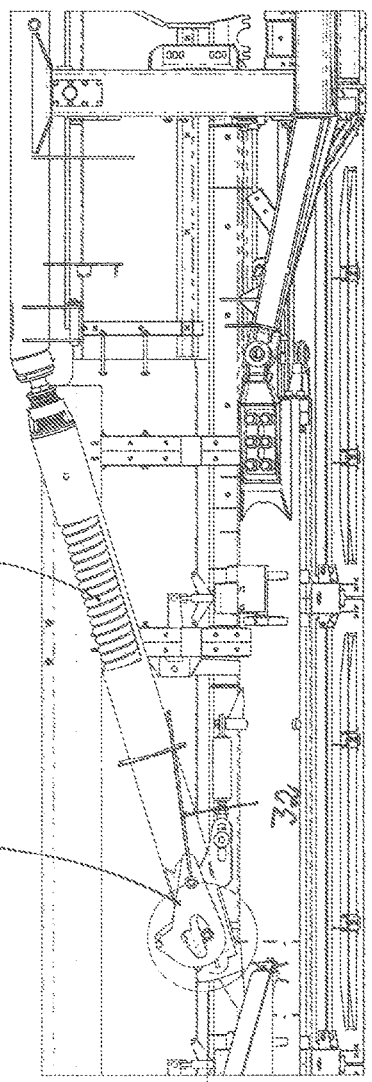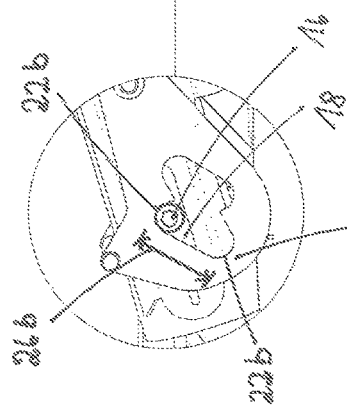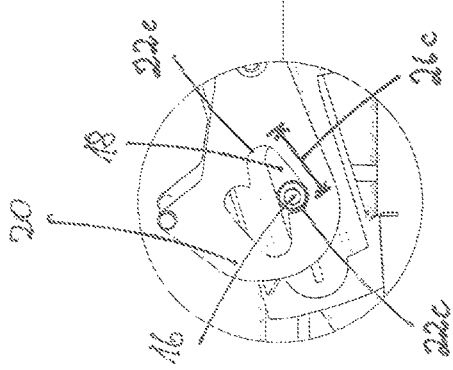
Fig. 5
Fig. 6

MULTI-SECTION HEADER WITH ADJUSTABLE LATERAL FRAME RELIEF

BACKGROUND OF THE INVENTION

The present invention concerns a multi-section header with several frame sections that are joined with each other for articulation and each form a partial working width of the header, wherein outer lateral frame sections are connected with a central frame section with each other by means of a relief element that is adjustable between a springy setting and a locked setting.

A header of the aforementioned kind is disclosed in U.S. Pat. No. 6,675,568. The header disclosed therein comprises a central frame section and two outer lateral frame sections joined for articulation thereto. Since the ground of a field across the total working width of the header does not remain flat upon forward travel of the harvester to which the header is attached in use, but can exhibit elevations and depressions, the individual frame sections with their partial working widths are supposed to better adapt to the soil contour by means of their articulated connection with each other. In particular the lateral frame sections with their free ends can pivot up or down relative to the central frame section in order to adapt in this way to a ground contour that is ascending or descending in lateral direction relative to the transverse axis of the central frame section.

In order to increase the reaction time of the lateral frame sections and to facilitate adaptation to the ground without risking in this context damaging the lateral frame sections, the lateral frame sections are connected with the central frame section by a relief element, respectively. The relief element supports a portion of the weight of the lateral frame section and introduces it into the frame of the central frame section. The remaining pressure with which a lateral frame section is supported on the ground is thus significantly reduced. By designing the relief element as a spring, the lateral frame sections can swing up or down with their free ends against the spring force when a ground contour changes during harvesting.

However, free swinging of the lateral frame sections against the spring in the relief element is not desirable in all situations of use of the header. In the header known from the prior art, the springs in the relief elements can therefore be bypassed by a selectively insertable rigid lock. With this lock, the relief elements can thus only be operated either with free spring action or in a rigid configuration.

It is the object of the present invention to provide an adjusting possibility that provides a greater variety in regard to the adjustment of the spring behavior of the relief element and that is easily operable.

SUMMARY OF THE INVENTION

The object is solved for a header of the aforementioned kind in that the relief element comprises a spring that is movable in the load direction and a spatial body that is rigid in the load direction, wherein the spring is connected to the lateral frame section by a bolt which is guided in a slotted hole formed on the rigid spatial body, wherein the spring travel of the spring is adjustable by means of a stop element, pivotable between different pivot positions, through stops formed on the stop element, and the stop element comprises at least two different stops.

By use of a stop element with at least two different stops, the adjusting possibilities for the relief element are expanded. The relief element therefore cannot only be adjusted back and forth between free spring action and locked spring, but it is possible, in accordance with the respective purpose of use, to limit the spring movement in one or both directions in a targeted way.

For example, in the stop element stops can be formed by means of which the relief element in one area allows for compression and stretching movement. For example, this area can be selected such that a lateral frame section, as needed, can compress or stretch freely by 4° upward or downward relative to the transverse axis of the central frame section until the bolt impacts on the stops. This corresponds to the normal pivot range of the lateral frame sections occurring during harvest operation. By means of the stop element it is thus possible to realize stops that cover the pivot movements of the lateral frame sections in normal harvest operation. Separate end stops for the relief element are thus obsolete.

In another pivot position of the stop element, a stop can be effective that delimits compression movement beginning at a certain pivot position and in a further pivot position a stop can be effective which limits a stretching movement beginning at a certain pivot position. For example, when transporting a header on roads, it is not desirable that a lateral frame section can elastically deflect in upward direction, but deflection in downward direction is definitely desired. When harvesting rapeseed, where the header must be maintained at a minimum height, it is conversely not desirable that a lateral frame section of the header elastically deflects in downward direction, but deflection in upward direction is however helpful.

As a rigid spatial member, round, angular or oval tubes, profile sections or other constructions are conceivable which are unflexible in the load direction for normally occurring loads.

According to one embodiment of the invention, the stop element is designed as a pivotable metal sheet that comprises a guide that, depending on the pivot position of the stop element, forms the respective stops. The metal sheet can be supported on a pivot bolt which is attached to the rigid spatial body. The metal sheet can be present in a doubled arrangement on opposite sides of the rigid spatial body wherein the construction is stabilized by a further connecting bolt. A guide can be easily stamped or cut by laser into a metal sheet. This embodiment as a whole is lightweight, inexpensive, and functionally reliable.

According to one embodiment of the invention, the stop element comprises at least a first pivot position, in which the stops are designed such that the spring travel of the spring from the zero position of the lateral frame section enables compression as well as stretching of the spring, and a second pivot position in which the stops are designed such that the spring travel of the spring from the zero position of the lateral frame section enables only compression or stretching of the spring. While the position of the stops in the first pivot position enables compression and stretching of the spring in both directions and insofar corresponds to the normal operation, the second pivot position provides the possibility to block either compression or stretching of the spring. In a third pivot position, an adjustment of the stop element in pivot positions is possible which correspond in a first pivot position to the normal operation, in a second pivot position to a blocking action of compression (stretching is still possible here), and a third pivot position to a blocking action of stretching (compression is still possible in this position).

According to one embodiment of the invention, the stop element is pivotably fastened on the rigid spatial body. The rigid spatial body forms a good abutment in which the stop element can be held. Since the rigid spatial body always moves together with the spring and the lateral frame section, no relative movements between the abutment, the slotted hole formed on the rigid spatial body, and the stop element occur.

According to one embodiment of the invention, in a central position the stop element has the greatest adjusting range and in the positions that are deviating from the central position has smaller adjusting ranges between the stops. In this solution, in one step the stop element can be adjusted by an adjusting action, beginning at the central position selected in normal situation, into another position in which the spring blocks earlier in one or both directions by a stop with reduced spacing relative to the zero position.

According to one embodiment of the invention, the rigid spatial body is designed as a tube having the spring inserted in its interior. In this configuration, the distribution of forces between the lateral frame section and the central frame section is identical independent of whether the relief element provides a support action via the spring or the rigid spatial body. The spring is for this purpose stationarily connected with one end by a support bolt with the rigid spatial body and the other end is guided in the slotted hole. The spring is protected from dirt and corrosion in the tube interior. Also, the spring is shielded better in regard to injury risks for the operators.

According to one embodiment of the invention, the rigid spatial body is connected by a ball joint with the central frame section and a spring element is inserted between the ball joint and the rigid spatial body. The spring can be designed as a spiral spring or as a laminated disk spring. Due to the additional spring it is possible to absorb impacts acting on the lateral frame element at least somewhat, even when the relief element provides a support action via the rigid spatial body as a result of the corresponding pivot position of the stop element.

According to one embodiment of the invention, the stop element is connected to a flexible adjusting lever that is flexible in the adjusting direction, and a connecting link is arranged at a spacing relative to the stop element; in the connecting link the adjusting lever can be secured in a position that corresponds to the actual position of the stop element or in a position that does not correspond to the actual position of the stop element. The adjusting lever serves firstly the purpose of holding the stop element in a preselected pivot position. Due to its flexibility in the adjusting direction, the adjusting lever can however also be utilized for adjusting the pivot position of the stop element by action of only one operator. For this purpose, the adjusting lever is moved from a position in the connecting link, which corresponds to the actual position of the stop element, into another position in the connecting link, which corresponds to the pivot position of the stop element to be newly adjusted, and is secured thereat. In this context, restoring forces are built up in the adjusting lever. When the operator in the cabin of the harvester then causes the header to rotate about the longitudinal axis of the machine that is oriented in the travel direction, the lateral frame section whose stop element is to be adjusted can move in a compression or stretching direction of the spring. When this spring movement occurs, the bolt which is guided within the slotted hole is also moved in the corresponding direction until the bolt in this context glides past a stop which corresponds to the pivot position of the stop element that is to be newly adjusted. Due to the restoring forces which have been built up upon adjustment of the adjusting lever into the new position, the stop element is moved into a new pivot position which corresponds to the afore adjusted position of the adjusting lever. In this way, the stop element is adjustable into a new pivot position by action of only one operator.

According to one embodiment of the invention, individual stops in the guide form the stop for several adjusting ranges. The adjusting travels for adjustment of the adjusting ranges can be kept short in this way. The guide in the stop element is also compact.

It is expressly noted that the afore described embodiments of the invention individually but also in any combination with each other can be combined with the subject matter of the independent claim, inasmuch as no technically compelling obstacles stand in the way.

Further modifications and embodiments of the invention can be taken from the following subject matter description and the drawings.

BRIEF DESCRIPTION OF THE DRAWINGS

The invention will now be disclosed in more detail with the aid of an embodiment.

FIG. 1 shows a partial view of a header from the rear.
FIG. 2 is a detail enlargement of the slotted hole and of the stop element.
FIG. 3 is a detail enlargement of the upper end of the rigid spatial body.
FIG. 4 is a detail view of the adjusting lever at a slant from the rear.
FIG. 5 is a view of the stop element in a second pivot position.
FIG. 6 is a view of the stop element in a third pivot position.

DESCRIPTION OF THE PREFERRED EMBODIMENTS

In FIG. 1 a partial view of a header 2 from the rear is shown. The header 2 is moved with its front side into the standing crop in order to cut the crop, gather it centrally, and move it to the rear into the intake channel of a harvester. The header 2 comprises a total working width which is comprised of the partial working widths of the frame sections that are joined with each other for articulation. A header 2 can be comprised, for example, of three or more frame sections that are articulated to each other. The lateral frame section 6 illustrated in FIG. 1 is connected to the central frame section 8 by a hinge 4. By means of hinge 4, the lateral frame section 6 can be pivoted with its free end in upward or downward direction.

The lateral frame section 6 is connected with the central frame section 8 additionally by a relief element 10. The relief element 10 transmits a portion of the weight of the lateral frame section 6 onto the frame of the central frame section 8. In this way, the pressure with which the lateral frame section 6 is gliding across the ground is reduced.

In the embodiment, the relief element 10 comprises a spring 12 and a rigid spatial body 14. The spring 12 is inserted into the interior of the rigid spatial body 14 which is configured as a tube in the embodiment. While the spring 12 allows for a springy adaptation movement of the lateral frame section 6 when the ground underneath drops or rises, the rigid spatial body 14 secures the lateral frame section 6 in a fixed spatial position relative to the central frame section 8, depending on whether the spring 12 can move in the direction of the adaptation movement or not.

In the embodiment, whether an adaptation movement of the spring 12 is possible depends on whether the bolt 16, which is supported in the slotted hole 18 and to which the spring 12 is secured with one end, is still movable or not in the direction of the adjustment movement. Movability of the bolt 16 in the slotted hole 18 is limited by the stop element 20. On the stop element 20 several stops 22 are formed in different positions in a guide 24. Depending on the pivot position of the stop element 20, different adjustment ranges 26 result in which the bolt 16 can move within the slotted hole 18. When the bolt 16 contacts a stop 22 during an adjusting movement, a further movement of the spring 12 in the direction limited by the stop 22 is thereby blocked at the same time.

The relief element 10 is connected by the ball joint 28 with the central frame section 8. The ball joint 28 enables the relief element 10 to adapt in regard to its spatial position to the pivot movements of the lateral frame section 6. The relief element 10 is additionally supported in a springy fashion relative to the central frame section 8 by a spring element 30. By means of the spring element 30, which is configured as a laminated disk spring in the embodiment, shocks and impacts from the lateral frame section 6 can be absorbed by the central frame section 8.

Finally in FIG. 1, an adjusting lever 32 is illustrated also with which the stop element 20 is adjustable. The adjusting lever 32 is connected with one end with the stop element 20. With the other end it is secured on the connecting link 34. By means of the adjusting lever 32, the stop element 20 is held in a pivot position without tensioning the adjusting lever 32. For adjustment of the pivot position of the stop element 20, the free end of the adjusting lever 32 is moved into a new position, which corresponds to the new desired pivot position of the stop element 20, and is secured therein in the connecting link 34. In doing so, restoring forces are built up in the adjusting lever 32 since the stop element 20 is still in its original position. In order for this to be possible, the adjusting lever 32 comprises a certain own flexibility due to its material and the selected material strength. When the bolt 16, by lifting or tilting the lateral frame section 6, is then moved in the slotted hole 18 into a position in which it is located in the adjusting range between the stops 22 of the preselected pivot position of the stop element 20, the stop element 20 glides, driven by the restoring forces which have been built up in the adjusting lever 32, into the preselected pivot position. At its end which is facing away from the bolt 16, the spring 12 is secured with a securing bolt 38 on the rigid body 14. The securing bolt 38 itself can be guided in a guide in order to be able to adjust the pretension of the spring 12 as needed.

In FIG. 1, the circle II indicates the detail which is shown in FIG. 2 in an enlarged illustration. The circle III shows the detail that is shown in FIG. 3.

In FIG. 2 a detail enlargement of the slotted hole 18 with the bolt 16 movable therein and of the stop element 20 in a first pivot position is shown. The actual pivot position of the stop element 20 effects for the bolt 16 the adjusting range 26a which is delimited by the stops 22a at the ends. Also illustrated are the adjusting ranges 26b and 26c with the stops 22b and 22c which are also possible depending on the pivot position and which are predetermined by the guide 24. The screw bolt 36 about which the stop element 20 can be pivoted is still recognizable partially in FIG. 2.

FIG. 3 shows a detail enlargement of the upper end of the rigid spatial body 14. By means of the ball joint 28, the rigid spatial body 14 is connected with the central frame section. Also shown is the spring element 30 which is embodied as a laminated disk spring.

FIG. 4 shows a detail view of the relief element 10 with the adjusting lever 32 from the rear at a slant. The adjusting lever 32 is located in the illustration in a central position. From this position, the adjusting lever 32 can be adjusted into the locked positions above or below on the connecting link 34.

FIG. 5 shows a view of the stop element 20 in a second pivot position. In this pivot position, the adjusting range 26b is shortened relative to the adjusting range 26a which is corresponding to the pivot position shown in FIGS. 1 and 2. As a result of the adjusting range 26b which is shortened particularly in upward direction by the stop 22b in the guide 24, the bolt 16 impacts so early on the upper stop 22b that the lateral frame section 6 with its free end can no longer be pivoted upwardly past the zero position or past another upper maximum pivot position relative to the central frame section 8. Due to the lower stop 22b farther removed from the zero position, a stretching movement of the spring 12 and thus pivoting of the free end of the lateral frame section 6 in downward direction is still possible in accordance with the length of the adjusting range 26b.

Finally, FIG. 6 shows a view of the stop element 20 in a third pivot position. Due to the adjusting range 26c which is shortened in particular in downward direction by the lower stop 22c, the bolt 16 impacts so early on the lower stop 22c that the lateral frame section 6 with its free end can no longer be pivoted past the zero position relative to the central frame section 8 in downward direction. Due to the upper stop 22c farther removed from the zero position, a compression movement of the spring 12 and thus pivoting of the free end of the lateral frame section 6 in upward direction is thus still possible in accordance with the length of the adjusting range 26c.

The invention is not limited to the afore described embodiment. A person of skill in the art will have no difficulties in modifying the embodiments in a way appearing suitable to him in order to adapt them to a concrete application situation.

The specification incorporates by reference the entire disclosure of German priority document 10 2015 116 892.8 having a filing date of Oct. 5, 2015.

While specific embodiments of the invention have been shown and described in detail to illustrate the inventive principles, it will be understood that the invention may be embodied otherwise without departing from such principles.

What is claimed is:
1. A header comprising:
frame sections that are joined for articulation with each other, the frame sections each form a partial working width of the header, wherein the frame sections include outer lateral frame sections and a central frame section;
a relief element connected to the central frame section and a first one of the outer lateral frame sections located adjacent to the central frame section;
wherein the relief element comprises a rigid spatial body and further comprises a spring arranged inside the rigid spatial body, the spring comprising a first end stationarily connected to the rigid spatial body and further comprising a second end opposite the first end, the second end connected by a bolt to the first outer lateral frame section, wherein the rigid spatial body comprises a slotted hole and the bolt extends through and is guided in the slotted hole;
wherein the spring is configured to enable movement of the second end relative to the first end in a loading direction of the spring relative to the rigid spatial body, wherein the rigid spatial body is rigid in the loading direction;

a pivotable stop element that comprises at least two stops operatively interacting with the bolt, wherein the pivotable stop element is configured to pivot into a plurality of pivot positions, wherein in each of the pivot positions the at least two stops define a different spring travel of the spring in the loading direction of the spring.

2. The header according to claim 1, wherein the stop element is a pivotable metal sheet that comprises a guide and the guide, depending on a selected pivot position of the stop element, forms the at least two stops.

3. The header according to claim 2, wherein the at least two stops each are used to define several adjusting ranges for the spring travel depending on a selected pivot position.

4. The header according to claim 1, wherein the pivot positions include:
  a first pivot position in which the at least two stops are arranged such that the spring travel of the spring, from a zero position of the first lateral frame section, permits compression and stretching of the spring;
  a second pivot position in which the at least two stops are arranged such that the spring travel of the spring, from the zero position of the lateral frame section, permits only compression of the spring or only stretching of the spring.

5. The header according to claim 1, wherein the pivot positions include a central position, wherein the central position of the stop element defines a maximum adjusting range for the spring travel between the at least two stops, wherein the pivot positions deviating from the central position define adjusting ranges for the spring travel between the at least two stops that are smaller than the maximum adjusting range.

6. The header according to claim 1, wherein the stop element is attached pivotably to the rigid spatial body.

7. The header according to claim 1, wherein the rigid spatial body is a tube and the spring is disposed in an interior of the tube.

8. The header according to claim 1, further comprising:
  an adjusting lever that is flexible in an adjusting direction and is connected to the stop element;
  a connecting link arranged at a spacing to the stop element;
  wherein the adjusting lever is securable in the connecting link in a first position that corresponds to an actual position of the stop element or in a second position that is not corresponding to an actual position of the stop element.

9. A header comprising:
  frame sections that are joined for articulation with each other, the frame sections each form a partial working width of the header, wherein the frame sections include outer lateral frame sections and a central frame section;
  a relief element connected to the central frame section and a first one of the outer lateral frame sections located adjacent to the central frame section, wherein the relief element is adjustable between a springy setting and a locked setting;
  wherein the relief element comprises a spring movable in a loading direction and further comprises a rigid spatial body that is rigid in the loading direction;
  wherein the rigid spatial body comprises a slotted hole and wherein the spring is connected to the first outer lateral frame section by a bolt that is guided in the slotted hole;
  a pivotable stop element that comprises at least two stops and is pivotable into a plurality of pivot positions, wherein a spring travel of the spring is adjustable by the at least two stops of the stop element;
  wherein the rigid spatial body is connected by a ball joint to the central frame section and a spring element is inserted between the ball joint and the rigid spatial body.

* * * * *